United States Patent [19]

Maeda

[11] 4,271,095
[45] Jun. 2, 1981

[54] IDLE ADJUSTING DEVICE FOR A CARBURETOR

[75] Inventor: Tooru Maeda, Hiroshima, Japan

[73] Assignee: Toyo Kogyo Co., Ltd., Hiroshima, Japan

[21] Appl. No.: 67,909

[22] Filed: Aug. 20, 1979

[30] Foreign Application Priority Data

Aug. 21, 1978 [JP] Japan .......................... 53/114805[U]

[51] Int. Cl.³ .............................................. F02M 3/08
[52] U.S. Cl. ........................... 261/41 D; 261/DIG. 38; 261/71; 137/382; 137/382.5
[58] Field of Search .............. 261/DIG. 38, 41 D, 71; 137/384, 382.5, 382

[56] References Cited

U.S. PATENT DOCUMENTS

| | | | |
|---|---|---|---|
| 1,248,683 | 12/1917 | Leach | 137/382 |
| 3,409,277 | 11/1968 | Reise | 261/71 |
| 3,618,906 | 11/1971 | Charron | 261/DIG. 38 |
| 4,097,561 | 6/1978 | Seki et al. | 261/DIG. 38 |
| 4,120,918 | 10/1978 | Codling | 261/DIG. 38 |

FOREIGN PATENT DOCUMENTS

| | | | |
|---|---|---|---|
| 1805124 | 6/1969 | Fed. Rep. of Germany | 137/382 |
| 2401803 | 9/1974 | Fed. Rep. of Germany | 261/DIG. 38 |
| 2634441 | 2/1977 | Fed. Rep. of Germany | 261/DIG. 38 |
| 45-42424 | 8/1970 | Japan | 261/DIG. 38 |
| 54-118923 | 9/1979 | Japan | 261/DIG. 38 |

*Primary Examiner*—Tim R. Miles
*Attorney, Agent, or Firm*—Fleit & Jacobson

[57] ABSTRACT

A carburetor for an internal combustion engine has an idle adjust screw. A cover is provided for encompassing the idle adjust screw so as to prevent any readjustment of the idle adjust screw by an operator. The cover is not removable once the carburetor is mounted on the intake pipe so that carburetor settings can be maintained. The cover may be formed with a slot of special configuration so that adjustment may be made only with a specially designed tool.

11 Claims, 4 Drawing Figures

IDLE ADJUSTING DEVICE FOR A CARBURETOR

The present invention relates to internal combustion engines and more particularly to idle adjusting devices for internal combustion engines. More specifically, the present invention pertains to cover means of idle adjusting elements for disabling access to the idle adjusting elements once carburetor adjustments have been accomplished.

It has well been recognized that carburetor settings have significant influences on pollutant emissions in exhaust gas. If the carburetor settings are changed in use, there will be a high possibility that the pollutant emissions are increased beyond allowable limits. It has therefore been proposed in order to prohibit any access to the idle adjust screw by an operator to provide the carburetor with a cover which is adapted to encompass the idle adjust screw. For example, the U.S. Pat. No. 4,097,561 issued to Seki et al. on June 27, 1978 discloses a carburetor idle mixture adjusting device having a cap which encompasses the head portion of the idle adjust screw. The cap is formed with a specially shaped slot through which access to the adjust screw head is permitted only by means of a specially designed tool. The proposed structure does not however provide a satisfactory result because it is not so difficult for the operator to remove the cap from the adjust screw to get an access thereto for the purpose of adjusting the carburetor settings and obtaining an increased engine output disregarding the regulations for pollutant emissions.

It is therefore an object of the present invention to provide a carburetor having idle adjust means provided with means for preventing any access thereto in use of the engine on which the carburetor is mounted.

Another object of the present invention is to provide a carburetor for internal combustion engines which is provided with means for preventing idle adjustments without a specially designed tool.

A further object of the present invention is to provide a carburetor having idle adjust means encompassed by cover means which cannot be removed without dismounting the carburetor from the engine.

According to the present invention, the above and other objects can be accomplished by intake means for an internal combustion engine comprising intake passage means, carburetor means mounted on said intake passage means for providing a supply of intake air-fuel mixture to the intake passage means, externally adjustable idle adjust means provided in said carburetor means, cover means removably attached to said carburetor means for encircling said idle adjust means so as to prevent ready access thereto, means preventing the cover means from being removed when the carburetor means is mounted on said intake passage means but allowing removal of said cover means when the carburetor means is removed from the intake passage means. The cover means may be formed with slot means of special configuration so that an access is permitted to the idle adjust means only with a specially designed tool having a configuration corresponding to that of the slot means.

The means for preventing removal of the cover means may be embodied in various ways. For example, the cover means may be attached to the carburetor means by means of at least one screw threaded fastener which is so located that it becomes inaccessible when the carburetor means is mounted on the intake passage means due to flange means provided on the intake passage means for mounting the carburetor means. Alternatively, the carburetor means may be provided at a surface for attachment to the intake passage means with groove means which is adapted for engagement with an edge of the cover means so that the removal of the cover means can be prevented when the carburetor means is mounted in position.

The above and other objects and features of the present invention will become apparent from the following descriptions of preferred embodiments taking reference to the accompanying drawings, in which.

Figure 1:
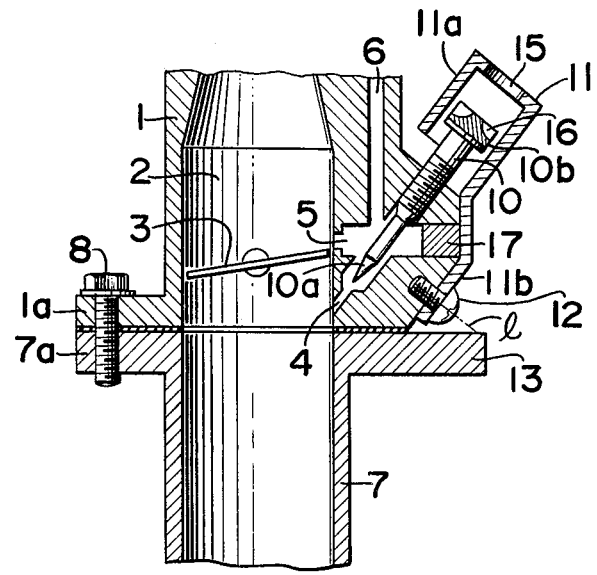
FIG. 1 is a fragmentary sectional view of an intake system for an internal combustion engine showing one embodiment of the present invention.
Figure 2:
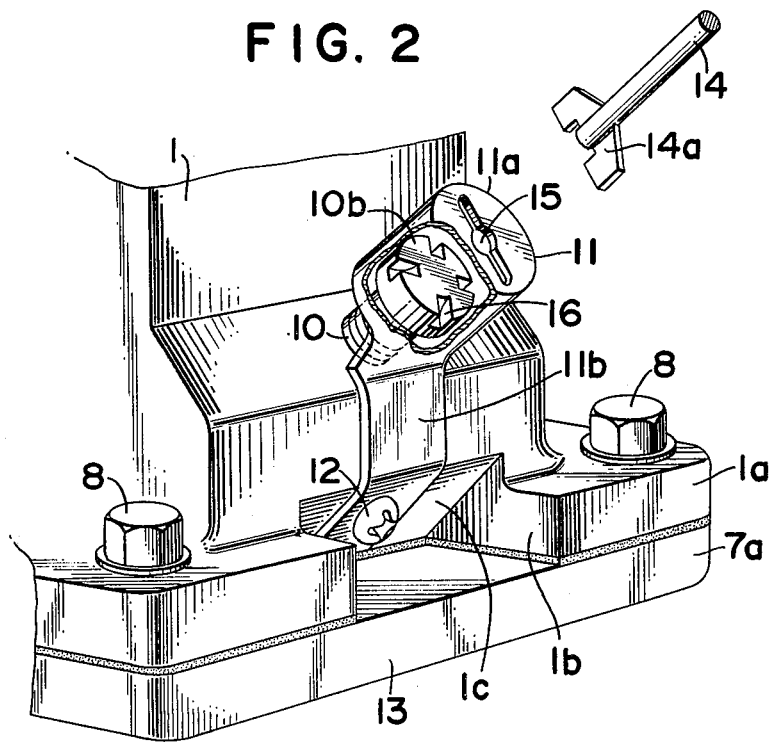
FIG. 2 is a perspective view of the embodiment shown in FIG. 1.

Referring now to the drawings, particularly to FIGS. 1 and 2, the intake system shown therein includes a carburetor having a carburetor body 1 formed with an intake passage 2. In the intake passage 2 of the carburetor body 1, there is provided a throttle valve 3. As conventional in the art, the carburetor body 1 is formed with an idle fuel port 4 and a slow fuel port 5 which open to the intake passage 2 in the vicinity of the throttle valve 3. The ports 4 and 5 lead to a slow fuel passage 6 which is in turn in communication with a fuel supply source such as a float chamber (not shown) of the carburetor.

Intake passage means of the engine is comprised of an intake pipe 7 which is formed at one end with a flange 7a for mounting the carburetor body 1. For the purpose, the carburetor body 1 has a flange 1a which is adapted to be attached to the flange 7a of the intake pipe 7 by means of bolts 8.

The carburetor body 1 has an idle adjust screw 10 which has a needle point 10a for cooperation with the idle fuel port 4. On the other end of the idle adjust screw 10, there is formed an actuating head 10b which is located outside the carburetor body 1 so that the idle fuel flow through the port 4 is adjusted by rotating the screw 10 through the actuating head 10b. A cover 11 is mounted on the carburetor body 1 and encompasses the head 10b of the idle adjust screw 10. The cover 11 is comprised of a substantially cylindrical cap portion 11a which encompasses the head 10b of the idle adjust screw 10 with a certain gap. The cover 11 further has a leg portion 11b which is formed integrally with the cap portion 11a and adapted to be attached to the carburetor body 1 by means of a threaded screw 12.

Referring to FIG. 2, it will be noted that the mounting flange 1a on the carburetor body 1 is cut-off at a side adjacent to the idle adjust screw 10 as shown by the reference character 1b and the carburetor body 1 is formed with a slanted surface 1c which is obliquely facing to the flange 7a of the intake pipe 7. The leg portion 11b of the cover 11 is attached to the carburetor body 1 at the slanted surface 1c so that the axis 1 of the attachment screw 12 is directed obliquely with respect to the flange 7a. As shown in FIG. 2, the flange 7a of the intake pipe 7 has a portion 13 extending across the cut-off portion 1b and an extension of the axis 1 of the screw 12 intersects the flange portion 13. It will therefore be understood that, once the carburetor is mounted on the intake pipe 7, it is no longer possible to remove the cover 11 unless the carburetor is removed.

The cap portion 11a of the cover 11 is formed at an outer end with a key-hole shaped access slot 15. A specially designed tool 14 having a bifurcated actuating head 14a may be used for actuating the head 10b of the idle adjust screw 10. The head 14a of the tool 14 is so shaped that it can pass through the slot 15 in the cap portion 11a. The head 10b of the idle adjust screw 10 is formed with diametrically opposed recesses 16 for receiving the actuating head 14a of the tool 14. Thus, when the cover 11 is mounted in position, the adjustment of the screw 10 can be made only with the specially designed tool 14.

Figure 3:
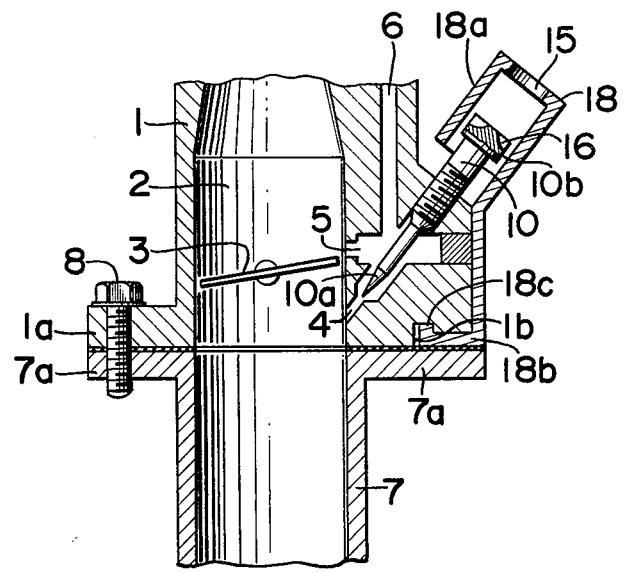
FIG. 3 is a fragmentary sectional view similar to FIG. 1 but showing another embodiment of the present invention.

Referring now to FIG. 3 in which corresponding parts are designated by the same reference characters as in FIGS. 1 and 2, the embodiment shown therein includes a cover 18 having a substantially cylindrical cap portion 18a which is adapted to encompass the idle adjust screw 10. The cover 18 has a leg portion 18b which is formed integrally with the cap portion 18a and adapted to be placed between the flange 1a of the carburetor body 1 and the flange 7a of the intake pipe 7. The mating surface of the carburetor body flange 1a is formed with a retaining groove 1b and the leg portion 18b of the cover 18 is formed at the free edge with a retaining pawl 18c which is adapted to be engaged with the groove 1b in the carburetor body 1. It will therefore be understood that, when the carburetor is mounted on the intake pipe 7, the cover 18 is firmly maintained in position and it is thus no longer possible to remove the cover 18 from the carburetor body 1 unless the carburetor is removed from the intake pipe 7. The cap portion 18a of the cover 18 may be formed with a slot 15 which is of a specially designed configuration for accommodating only a specially designed tool as in the previous embodiment. In the arrangement shown in FIG. 3, the retaining groove 1b and the retaining pawl 18c may be omitted so that the leg portion 18b is simply held between the flanges 1a and 7a.

Figure 4:
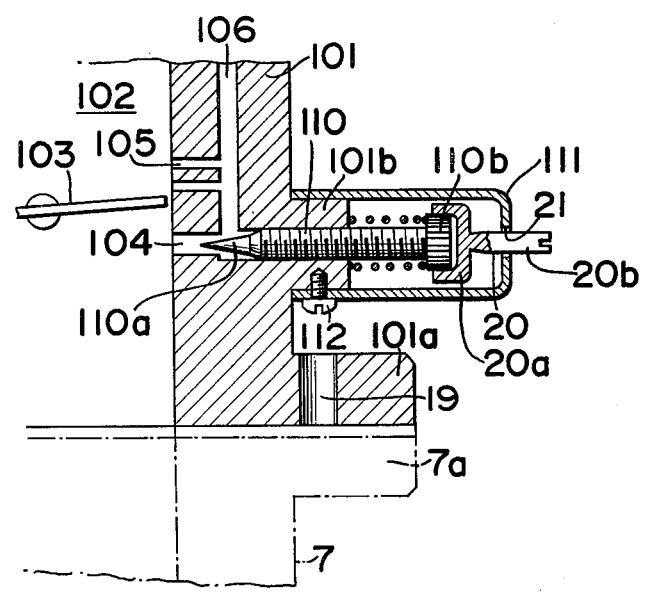
FIG. 4 is a fragmentary sectional view showing a further embodiment of the present invention.

Referring to FIG. 4 which shows a further embodiment of the present invention, the carburetor shown therein includes a carburetor body 101 having a mounting flange 101a for attachment to the flange 7a of the intake pipe 7. The carburetor body 101 is formed with an intake passage 102 having a throttle valve 103 provided therein. The carburetor body 101 further has an idle fuel port 104 and slow fuel ports 105 which are in communication with a slow fuel passage 106. An idle adjust screw 110 having a needle point 110a is provided for adjustment of the opening of the idle fuel port 104. The idle adjust screw 110 is formed at the outer end with an actuating knob 110b.

Around the idle adjust screw 110, the carburetor body 101 is formed with a boss portion 101b on which a cover 111 is mounted and secured thereto by means of a screw 112. The cover 111 is of a substantially cylindrical cup shaped configuration and encompasses the idle adjust screw 110. The attachment screw 112 is inserted through the cover 111 into the boss portion 101b of the carburetor body 101 at a side facing to the flange 101a of the carburetor body 101. The flange 101a is formed with a hole 19 which is so located that a screw driver is inserted through the hole 19 for actuating the screw 112. Thus, the attachment screw 112 can be removed only through the hole 19. It will therefore be understood when the carburetor is mounted on the intake pipe 7 it becomes no longer possible to remove the screw 112 since the hole 19 is covered by the flange 7a of the intake pipe 7. Therefore, it is impossible to remove the cover 111 from the carburetor body 101 as long as the carburetor is mounted on the intake pipe 7.

In the embodiment shown in FIG. 4, there is provided a space in the cover 111 behind the head portion 110b of the screw 110. An adjusting member 20 having a cup-shaped head 20a is disposed in the cover 111 and engaged at the head 20a with the knob 110b of the idle adjust screw 110. The adjusting member 20 has a rod 20b which is integral with the head 20a and extending outwardly through a hole 21 formed in the cover 111. In this arrangement, after the carburetor is installed on the intake pipe 7, the idle adjust screw 110 can be adjusted through the member 20. As soon as the adjustment is completed, the rod 20b of the adjusting member 20 is pulled axially outwardly to have the head portion 20a disengaged from the knob 110b of the idle adjust screw 110 and the rod 20b is then cut-off at the end of the cover 111. Then, it becomes no longer possible to adjust the screw without removing the carburetor from the intake pipe 7.

The invention has thus been shown and described with reference to specific embodiments, however, it should be noted that the invention is in no way limited to the details of the illustrated arrangements but changes and modifications may be made without departing from the scope of the appended claims. For example, in the embodiments shown in FIGS. 1 and 4, the mounting flange of the intake pipe is utilized for preventing the cover attachment screw from being removed. However, it may of course be possible to provide a blocking wall specifically designed for the purpose. Alternatively, engine accessories may be installed in the vicinity of the cover attachment screw for disturbing removal of the cover attachment screw so as to constitute the means for preventing removal of the cover.

I claim:

1. Intake means for an internal combustion engine comprising intake passage means including mounting flange means, carburetor means mounted on said mounting flange means of said intake passage means for providing a supply of intake air-fuel mixture to the intake passage means, externally adjustable idle adjust means provided in said carburetor means and having adjusting head means projecting externally from said carburetor means so that said adjusting head means can readily be actuated even when the carburetor means is mounted on the intake passage means, cover means including a first portion encircling said idle adjust means so as to prevent ready access thereto and a second portion adapted for attachment to said carburetor means, said second portion being made inaccessible by said mounting flange means on the intake passage means when the carburetor means is mounted on said intake passage means and made accessible when the carburetor means is removed from the intake passage means, said cover means being attached to the carburetor means by means of at least one screw threaded fastener which is inserted through said second portion into the carburetor means and has a longitudinal axis which is so directed that an extension thereof intersects the mounting flange means of said intake passage means when the carburetor means is mounted on said intake passage means whereby the fastener is prevented from being driven.

2. Intake means in accordance with claim 1 in which said carburetor means has flange means which is adapted to be attached to the mounting flange means on the intake passage means, said flange means on the carburetor means having a cut-off portion adjacent to the idle adjust means, said mounting flange means on the intake passage means having a portion extending across the cut-off portion of the flange means on the carburetor means, said cover means being attached to the carburetor means at the cut-off portion so that the extension of said screw threaded fastener intersects said portion of the mounting flange means on the intake passage means.

3. Intake means in accordance with claim 1 in which said carburetor means has flange means which is adapted to be attached to the mounting flange means on the intake passage means, said flange means on the carburetor means being formed with at least one hole, said screw threaded fastener being so located that it can be driven only through the hole in the flange means of the carburetor means.

4. Intake means in accordance with claim 1 in which said cover means is formed with slot means of special configuration so that an access is permitted to the idle adjust means only with a specially designed tool having a configuration corresponding to that of the slot means.

5. Intake means in accordance with claim 1 in which said cover means has no means for inserting an adjusting tool to said idle adjust means after it has been attached to the carburetor means and said idle adjust means has been adjusted.

6. Intake means for an internal combustion engine comprising intake passage means including mounting flange means, carburetor means having flange means mounted on said mounting flange means of said intake passage means for providing a supply of intake air-fuel mixture to the intake passage means, externally adjustable idle adjust means provided in said carburetor means, cover means removably attached to said carburetor means for encircling said idle adjust means so as to prevent ready access thereto, means for preventing the cover means from being removed when the carburetor means is mounted on said intake passage means and for allowing removal of said cover means when the carburetor means is removed from the intake passage means, said cover means being attached to the carburetor means by means of at least one screw threaded fastener which is so located that it becomes inaccessible when the carburetor means is mounted on the intake passage means due to said mounting flange means provided on the intake passage means, said flange means on the carburetor means having a cut-off portion adjacent to the idle adjust means, said mounting flange means on the intake passage means having a portion extending across the cut-off portion of the flange means on the carburetor means, said cover means being attached to the carburetor means at the cut-off portion, said screw threaded fastener being so directed that it has a longitudinal axis of which extension intersects said portion of the mounting flange means on the intake passage means.

7. Intake means in accordance with claim 6 in which said cover means is formed with slot means of special configuration so that an access is permitted to the idle adjust means only with a specially designed tool having a configuration corresponding to that of the slot means.

8. Intake means in accordance with claim 6 in which said cover means has no means for inserting an adjusting tool to said idle adjust means after it has been attached to the carburetor means and said idle adjust means has been adjusted.

9. Intake means for an internal combustion engine comprising intake passage means including mounting flange means, carburetor means having flange means mounted on said mounting flange means of said intake passage means for providing a supply of intake air-fuel mixture to the intake passage means, externally adjustable idle adjust means provided in said carburetor means, cover means removably attached to said carburetor means for encircling said idle adjust means so as to prevent ready access thereto, means for preventing the cover means from being removed when the carburetor means is mounted on said intake passage means and for allowing removal of said cover means when the carburetor means is removed from the intake passage means, said cover means being attached to the carburetor means by means of at least one screw threaded fastener which is so located that it becomes inaccessible when the carburetor means is mounted on the intake passage means due to said mounting flange means provided on the intake passage means, said flange means on the carburetor means being formed with at least one hole, said screw threaded fastener being so located that it can be driven only through the hole in the flange means of the carburetor means.

10. Intake means for an internal combustion engine comprising intake passage means including mounting flange means, carburetor means mounted on said mounting flange means of said intake passage means for providing a supply of intake air-fuel mixture to the intake passage means, externally adjustable idle adjust means provided in said carburetor means, cover means removably attached to said carburetor means for encircling said idle adjust means so as to prevent ready access thereto, said cover means having leg means for preventing the cover means from being removed when the carburetor means is mounted on said intake passage means and for allowing removal of said cover means when the carburetor means is removed from the intake passage means, said leg means being adapted to be held between the carburetor means and the intake passage means so that the cover means is unremovably maintained in position.

11. Intake means in accordance with claim 10 in which said leg means on the cover means has retaining pawl means which is adapted to be engaged with retaining groove means formed in said carburetor means.

* * * * *